July 15, 1930.  R. S. JACOBSEN  1,770,408
VARIABLE SPEED TRANSMISSION GEARING
Filed Feb. 23, 1926  2 Sheets-Sheet 1
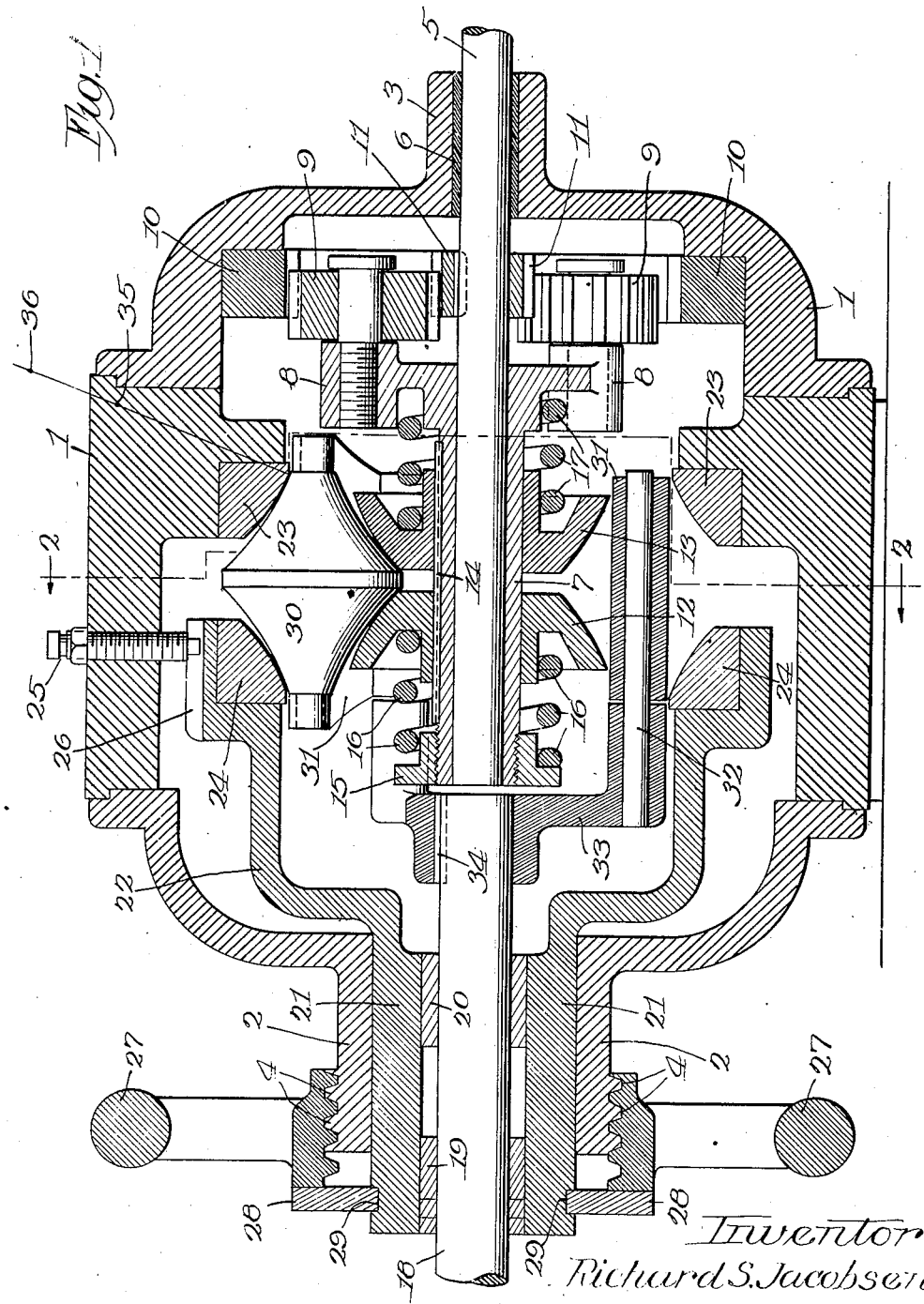
Inventor:
Richard S. Jacobsen
By Arthur F. Durand
Atty.

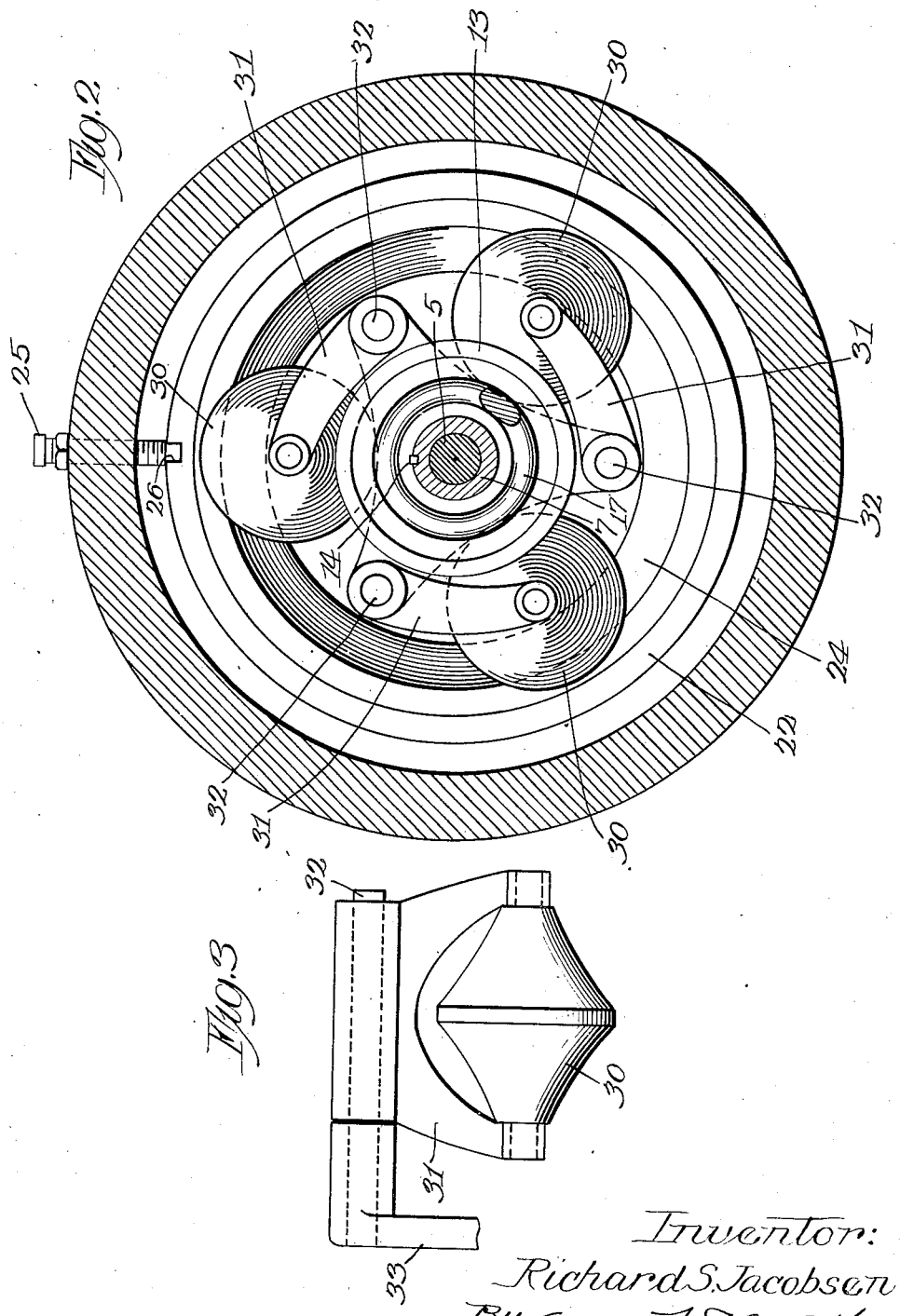

Patented July 15, 1930

1,770,408

UNITED STATES PATENT OFFICE

RICHARD S. JACOBSEN, OF WHEATON, ILLINOIS, ASSIGNOR, BY DIRECT AND MESNE ASSIGNMENTS, TO J. F. S. COMPANY, OF CHICAGO, ILLINOIS, A CORPORATION OF ILLINOIS

VARIABLE-SPEED TRANSMISSION GEARING

Application filed February 23, 1926. Serial No. 89,951.

This invention relates to change speed friction drive gearing in general, but more particularly to friction drive gearing of the kind shown and described in my prior applications Serial No. 16,594, filed March 19, 1925, and Serial No. 51,350, filed August 20, 1925.

Generally stated, therefore, the object of the invention is to provide a novel and improved construction and arrangement, whereby friction driving means of novel and improved form, preferably containing one or more rolling elements, is employed to change the speed at will.

Another object is to provide a novel and improved construction whereby the rolling means will roll with less friction on the raceways, thus eliminating the grinding action between the rolling means and the raceways, which has characterized some of the structures heretofore employed for this purpose.

It is also an object to provide certain details and features of construction tending to increase the general efficiency and the desirability of change speed gearing of this particular character.

To these and other useful ends, the invention consists in the matters hereinafter set forth and claimed, and shown in the accompanying drawings, in which,—

Fig. 1 is a longitudinal section of a change speed gearing embodying the principles of the invention.

Fig. 2 is a transverse section on line 2—2 in Fig. 1.

Fig. 3 is a detail view of one of the rolling elements, and of a portion of a support therefor.

As thus illustrated, the invention comprises a rigid and stationary casing 1 having a hub-like bearing portion 2 at the left thereof, and a similar portion 3 at the right end of the casing, the portion 2 having external screw threads 4, as shown. The shaft 5 is driven by any suitable power, and is arranged to extend axially through the casing 1, being supported by the bushing 6 and the sleeve 7, which latter is provided with three equidistant arms 8 that carry the gears 9 which engage the internal tooth ring gear 10 fixed to the casing. A pinion 11 is fixed on the shaft 5 to engage the gears 9, whereby rotation of the shaft 5 will cause rotation of the sleeve 7 in the same direction, but at a different speed. The two raceways 12 and 13 are keyed by a spline 14 on the sleeve 7, and a ring 15 is screwed at the end of the sleeve 7, as shown. A coil spring 16 is interposed between the ring 15 and the raceway 12, and a similar coil spring 17 is interposed between the raceway 13 and the arms 8, whereby the two raceways are pressed toward each other by said springs. Another shaft 18 is axially aligned with the shaft 5 and is supported in bushings 19 and 20 mounted in the hub portion 21 of the axially movable, but non-rotary, member 22, arranged as shown. The casing 1 is provided with a raceway 23, and the member 22 is provided with a similar raceway 24, as shown. A screw 25 is inserted through the casing 1 to engage the groove 26 in the member 22, whereby this member is held against rotation, but is movable endwise or axially within the hub 2 of the casing. For such adjustment, a hand wheel 27 is provided with screw threads to engage the screw threads 4 on the hub 2, and is provided with a rigid ring or washer portion 28 to engage the annular groove 29 in the hub portion 21, whereby rotation of the wheel 27 will cause axial movement of the member 22 to change the speed of the gearing, as will hereinafter more fully appear.

The rolling elements 30 are preferably three in number and are mounted on axes carried by the arms 31, which latter in turn are mounted on spindles 32 carried by the member 33, which latter is held by a key 34 on the shaft 18. The members 30 are arranged equidistant, as shown in Fig. 2, and engage the four raceways 13 and 12 and 23 and 24, as shown. Each member 30 is preferably shaped as shown, each member tapering from its center toward its opposite ends, not with a straight taper, but with some concavity, whereas the raceways in cross section are characterized by some convexity. In this way the curvature of the raceway 23, for example, in cross section, is on the line of a circle struck from a point 35 within the diameter of the casing, whereas the curvature of the member 30 is on the line of a circle struck from a point 36 outside of said diameter, but on the same radius line (see Fig. 1 of the drawings). The other raceways and engaging surfaces of the members 30 bear the same relation to each other, whereby in each case a raceway which is convex in cross section engages a concave surface of each rolling member.

When the shaft 5 is rotated, the consequent rotation of the sleeve 7 will rotate the raceways 12 and 13, and this will rotate the members 30, causing the latter to roll around on the raceways 23 and 24, thus causing rotation of the member 33, and causing the shaft 18 to rotate as well. The speed of rotation of the shaft 18, therefore, will depend upon the adjustment of the member 22, for by adjusting the latter axially the speed of the shaft 18 will be changed or varied. When the raceway 24 is moved toward the raceway 23, these raceways then engage the greater diameters of the members 30, and push the latter toward the shaft 5, thus crowding the raceways 12 and 13 apart, so that these inner raceways 12 and 13 then engage the lesser diameters of the members 30, causing a consequent change in the speed at which the shaft 18 is rotated. As the members 30 are tapered toward their opposite ends, in the manner shown, with some inward curvature, it will be seen that their surfaces engage the raceways in a manner to roll with very little, if any, grinding action on the raceways, regardless of where the raceways engage said rotary elements 30, and regardless of whether the mechanism is working with high speed or low speed transmission.

With the construction shown and described, the shaft 5 is the input shaft, which means that this is the shaft which receives the power, while the shaft 18 is the output shaft, which means that this latter shaft is the one that transmits the power from the gearing or mechanism at the desired speed. When the raceway 24 is moved toward the raceway 23, the raceways 12 and 13 are thereby crowded farther apart, so that these two inner raceways then engage the rolling members 30 at or near their outer ends, on a smaller diameter of these rolling members, thus causing the output shaft 18 to rotate faster. Then, when the raceway 24 is moved away from the raceway 23, as shown, the speed of the shaft 18 is thereby reduced, inasmuch as this brings the raceways 12 and 13 into contact with the greater diameter of the members 30, so that the latter are not rotated so fast. Thus, through the medium of the one non-rotary but axially adjustable raceway 24, the variable point of contact on the outer sides of the rolling members 30 is subject to direct manual control, and through this direct manual control over this one raceway the variable point of contact of the other three raceways is subject to indirect manual control, so to speak, thereby to control the speed of output of power from the shaft 18 in the manner described.

Without disclaiming anything, and without prejudice to any novelty shown and described, what I claim as my invention is:

1. A variable speed friction drive transmission comprising a plurality of rolling members, each member being substantially conical from its middle toward each end thereof, so that each member is tapered toward its opposite ends, instrumentalities for causing said members to rotate about their parallel and longitudinal axes, and at the same time to revolve around the central longitudinal axis of the gearing structure as a whole, by power input transmission to the inner side of each said member, in combination with adjusting means to cause certain engaging elements of said instrumentalities to have a variable contact with said rolling members, whereby the contact on the outer side of each member is under control, so that the rolling members are under control by the outer contact, while the inner contact is under control by the outer contact through the medium of said members, and power output means deriving a variable speed of rotation from said variable contact and the consequent variable speed of said rolling members.

2. A structure as specified in claim 1, said rolling members each having the taper thereof characterized by more or less concavity when the member is viewed at right angles to its axis, and said engaging elements having more or less convexity in cross section, so that in cross section each raceway presents an outwardly rounded surface to said members.

3. A structure as specified in claim 1, said instrumentalities comprising non-rotary outer raceways on which the rolling members travel, and comprising rotary inner raceways on which the rolling members travel, each raceway having more or less convexity in cross section, so that in cross section each raceway presents an outwardly rounded surface to said members.

4. In a change speed friction drive transmission, the combination of revolving members, raceways engaging said members, adapted to have a variable contact therewith, operative by power input transmission to the inner side of each member for causing the revolution of said members about the axis of said raceways, each member being tapered from its middle toward its opposite ends, so that each member is more or less conical at each end, means for causing relative adjustment of said raceways to vary the contact thereof with said members, whereby the contact on the outer side of each member is under control, so that said members are under control by a non-rotary raceway, while a rotary raceway is under control by said non-rotary raceway through the medium of said members, thereby adapted to cause a variable speed of revolution of said members about the central longitudinal axis of the transmission, and power output means deriving a variable speed of rotation from the variable speed of said members.

5. In a change speed transmission, the combination of a plurality of rotary and non-rotary convex race-ways, a plurality of members having rolling contact with said raceways, operative by power input transmission to the inner side of each member for causing the revolution of said members about the axis of said raceways, each rolling member having more or less concave conical formation, and means for causing relative adjustment of said raceways by adjustment of a non-rotary raceway relatively to a fixed non-adjustable raceway to change the contact on said members whereby to change the speed of transmission, and power output means deriving a variable speed of rotation from said members.

6. A structure as specified in claim 5, there being at least two non-rotary raceways, the adjustment of said raceways being in the direction of the longitudinal axis of said transmission, and said members having some axial adjustment in the same direction.

7. A structure as specified in claim 5, said members being provided with axes mounted on swinging members forming part of said power output means.

8. A structure as specified in claim 5, each member being characterized by more or less concavity on its engaging surface, and each raceway in cross section being characterized by more or less convexity, whereby a convex raceway surface engages a concave rolling-member surface.

9. In a change speed friction drive power transmission mechanism, the combination of an annular raceway, a smaller annular raceway, rolling members interposed between said raceways, means forming an axis common to both raceways and for supporting said raceways concentrically in the same plane and for relative rotation about said axis, means to communicate power to said mechanism, power output means driven by and deriving a variable speed of rotation from and in unison with the variable speed of travel of said members to transmit power from said mechanism, and means to relatively control said raceways and rolling members and whereby the larger raceway and the point of contact thereof on the outer side of each member is under control, so that the rolling members are under control by the outer raceway, while the inner raceway is under control by the outer raceway through the medium of said members, thereby to change the speed of transmission, said rolling friction members each having a maximum diameter at the middle thereof and tapering therefrom in opposite directions to a smaller diameter, and said controllable variable contact being on the outer sides of said tapering portions of said rolling members, from larger to smaller diameter, or vice versa, thereby to change the speed of output of power from said mechanism.

10. A variable speed friction drive transmission comprising a plurality of rolling members, instrumentalities for causing said members to rotate about their parallel and longitudinal axes, at the same time to revolve about the central longitudinal axis of the gearing structure as a whole, by power input transmission to the inner side of each said member, in combination with adjusting means to cause certain engaging elements of said instrumentalities to have a variable contact with both the inner and outer sides of said rolling members, whereby the rolling members are under control by non-rotary engaging elements, while rotary engaging elements are under control by said non-rotary elements through the medium of said members, and whereby the point of contact on the outer side of each member is under control, and power output means deriving a variable speed of rotation from said variable contact and the consequent variable speed of said rolling members, said rolling friction members each having a maximum diameter at the middle thereof and tapering therefrom in opposite directions to a smaller diameter, and said controllable variable contact being on the outer sides of said tapering portions of said rolling members, from larger to smaller diameter, or vice versa, thereby to change the speed of output of power from said mechanism.

11. In a change speed friction drive gearing, the combination of revolving members, convex raceways engaging said members, adapted to have a variable contact with both the inner and outer sides thereof, and means for causing relative adjustment of said raceways to vary the contact thereof with said members, whereby the point of contact on the outer side of each member is under control, so that the rolling members are under control by the outer raceway, while the inner raceway is under control by the outer raceway through the medium of said members, thereby to cause a variable speed of revolution of said members about the central longitudinal axis of the gear structure, by power input transmission to the inner side of each said member, at least one raceway having a fixed position, and power output means engaging and propelled by said members and excluding all of said raceways and deriving a variable speed of rotation from the variable speed of said members, said rolling friction members each being of maximum diameter at the middle thereof and concave, tapering therefrom in opposite directions to a smaller diameter, and said controllable variable contact being on the concave outer sides of said tapering portions of said rolling members, from larger to smaller diameter, or vice versa, thereby to change the speed of output of power from said mechanism.

12. In a change speed gearing, the combination of a plurality of raceways, at least one raceway having a fixed position, a plurality of members having rolling contact with said raceways, and power output means engaging and propelled by said members and excluding all of said raceways and deriving a variable speed of rotation from the variable speed of said members, and means for causing relative adjustment of said raceways to change the contact on both the inner and outer sides of said members, whereby the point of contact on the outer side of each member is under control, so that the rolling members are under control by the outer raceway, while the inner raceway is under control by the outer raceway through the medium of said members, whereby to change the speed of transmission, said rolling friction members each being of maximum diameter at the middle thereof and concave, tapering therefrom in opposite directions to a smaller diameter, and said controllable variable contact being on the outer sides of said concave tapering portions of said rolling members, from larger to smaller diameter, or vice versa, thereby to change the speed of output of power from said mechanism.

13. In variable speed power transmitting mechanism, the combination of a shaft to receive the power to be transmitted through said mechanism, a shaft to transmit the power from said mechanism, the two shafts being in alinement, raceways on said input shaft rotatable therewith and automatically movable toward and away from each other, rolling members engaging said raceways, a stationary outer raceway, an axially movable outer raceway also engaging said rolling members, means to communicate the power from said rolling members to said output shaft, means to adjust said outer movable raceway, thereby to cause a variable contact between each raceway and each rolling member, whereby the variable contact on the outer side of each rolling member is subject to control, together with means to connect said inner raceways to said input shaft, said rolling friction members each having a maximum diameter at the middle thereof and tapering therefrom in opposite directions to a smaller diameter, and said controllable variable contact being on the outer sides of said tapering portions of said rolling members, from larger to smaller diameter, or vice versa, thereby to change the speed of output of power from said mechanism.

14. In mechanism of the class described, the combination of outer non-rotary convex raceways, inner rotary convex raceways, convex oppositely tapered rolling members disposed between the outer raceways and the inner raceways, adjusting means for causing the raceways to have a variable contact on said members, to cause a variable speed of travel of said members, power input means including one or more of said raceways, and power output means driven by and deriving a variable speed of rotation from and in unison with the variable speed of travel of said members, said raceways formed to engage the concave oppositely tapered portions of each rolling member.

15. A structure as specified in claim 14, the faces of said raceways being curved and rounded outward in cross section in a manner to minimize contact thereof with the concave sides of said rolling members.

16. A structure as specified in claim 14, the oppositely tapered portions of each rolling member being slightly concave tapered in longitudinal section, and the faces of said raceways being slightly convex in cross section, with curve of each raceway struck from a shorter radius than the curve of the tapered portion of each member, thereby minimizing the frictional contact between the raceways and said members.

17. A structure as specified in claim 14, comprising an input shaft forming part of said input means for rotating the inner raceways, and said output means comprising an output shaft and a support rigid with said output shaft and spindles rigid with said support and extending parallel with the axis of each shaft and a yoke slidable axially on each spindle, each rolling member being mounted for rotation between the arms of a yoke, whereby the power is communicated to the output shaft, and means for relatively adjusting said raceways and rolling members, causing axial displacement of said rolling members, for varying the speed of the output shaft.

18. In mechanism of the class described, the combination of outer non-rotary raceways, inner rotary raceways, an input shaft for rotating the inner raceways, an output shaft, a support rigid with said output shaft, spindles rigid with said support, extending parallel with the axis of each shaft, a yoke slidable axially on each spindle, each rolling member being mounted for rotation between the arms of a yoke, whereby the power is communicated to the output shaft, and means for relatively adjusting said raceways and rolling members, causing axial displacement of said rolling members, for varying the speed of the output shaft.

19. A variable speed power transmission comprising a plurality of concave rolling members, and a convex raceway engaging said members, together with instrumentalities for varying the contact of the raceway on said members, in combination with means deriving a variable speed of rotation from the variable speed at which said members revolve around the longitudinal axis of said transmission.

Specification signed this 16th day of Feb., 1926.

RICHARD S. JACOBSEN.